(12) United States Patent
Kim et al.

(10) Patent No.: US 8,577,324 B2
(45) Date of Patent: Nov. 5, 2013

(54) BPS RECEIVER

(75) Inventors: Hyung Jung Kim, Daejeon (KR); Jae Hyung Kim, Gyeongsangnam-do (KR)

(73) Assignees: Electronics and Telecommunications Research Institute, Daejeon (KR); Changwon National University Industry Academy Cooperation Corps, Changwon-Si (KR)

( * ) Notice: Subject to any disclaimer, the term of this patent is extended or adjusted under 35 U.S.C. 154(b) by 638 days.

(21) Appl. No.: 12/793,124

(22) Filed: Jun. 3, 2010

(65) Prior Publication Data

US 2010/0330949 A1 Dec. 30, 2010

(30) Foreign Application Priority Data

Jun. 25, 2009 (KR) .......................... 10-2009-0057193

(51) Int. Cl.
*H04B 1/08* (2006.01)

(52) U.S. Cl.
USPC ............ 455/339; 375/260; 375/326; 708/313

(58) Field of Classification Search
USPC .................... 455/339; 375/260, 326; 708/313
See application file for complete search history.

(56) References Cited

U.S. PATENT DOCUMENTS

| | | | | |
|---|---|---|---|---|
| 2007/0063769 | A1* | 3/2007 | Jelonnek | 330/149 |
| 2007/0172001 | A1* | 7/2007 | Kitta et al. | 375/326 |
| 2008/0013639 | A1* | 1/2008 | Rick et al. | 375/260 |
| 2008/0013653 | A1 | 1/2008 | Fudge et al. | |
| 2008/0095471 | A1* | 4/2008 | Kim et al. | 382/300 |
| 2008/0133630 | A1* | 6/2008 | Bang et al. | 708/313 |
| 2008/0256157 | A1* | 10/2008 | Bostaman et al. | 708/306 |
| 2008/0288094 | A1* | 11/2008 | Fukushima | 700/94 |

FOREIGN PATENT DOCUMENTS

| | | |
|---|---|---|
| KR | 2001-0080362 | 8/2001 |
| KR | 10-2006-0030813 | 4/2006 |
| KR | 10-2006-0116828 | 11/2006 |
| KR | 10-2006-0121126 | 11/2006 |
| KR | 10-2007-0066674 | 6/2007 |
| KR | 10-2008-0113306 | 12/2008 |

OTHER PUBLICATIONS

Korean Notice of Allowance mailed Mar. 13, 2013 for corresponding Korean Application No. 10-2009-0057193.

* cited by examiner

*Primary Examiner* — Temesgh Ghebretinsae
*Assistant Examiner* — Richard Chan
(74) *Attorney, Agent, or Firm* — Staas & Halsey LLP

(57) ABSTRACT

The present invention receives simultaneously RF signal of different frequency band and processes the RF signal received, at this time a BPS receiver minimizes aliasing generated by RF signal. The present invention comprises a sampling process unit which samples a signal summing a first RF signal and a second RF signal of different frequency bands with time gap, a quantization process unit which generates a first stream signal and a second stream signal from signals sampled by the sampling process unit according respective time information in the signal summing the first RF signal and the second RF signal and a signal process unit which performs FIR filtering with reference to phase shift for a respect frequency band of the first stream signal and the second stream signal, separates the first RF signal and the second RF signal based on a result of the performance.

4 Claims, 2 Drawing Sheets

BPS RECEIVER

CROSS-REFERENCE TO RELATED APPLICATION

This application claims priority from Korean Patent Application No. 2009-0057193, filed on Jun. 25, 2009 in the Korean Intellectual Property Office, the disclosure of which is incorporated herein by reference in its entirety.

BACKGROUND OF THE INVENTION

1. Field of the Invention

The present invention relates to a BPS receiver, and more particularly, to a BPS receiver which can receive simultaneously RF signal of different frequency band and process the RF signal received, minimize aliasing generated by RF signal.

2. Description of the Related Art

When a receiving unit converts a RF signal of a transmitting unit to a digital signal, if a receiver processes a RF signal according to a conventional sampling theory, the receiver should sample a RF signal with using double sampling rate for a carrier wave frequency(fc) of a RF signal.

The sampling rate increases simultaneously as the frequency of a RF signal increase. But, conventionally a real signal exists in 0.003%-0.2% of a modulated signal (RF signal) by a carrier wave frequency(fc). When a signal is modulated by a carrier wave frequency of high frequency, a receiver should sample a RF signal by higher sampling rate, sampled data's amount increase exponentially. Therefore, a receiver performs inefficiently process of data.

In order to solve the problem, a band pass sampling can sample a RF signal with using sampling rate which is lower than Nyquist rate of a RF signal.

The band pass sampling performs a sampling with using sampling rate which is lower than Nyquist rate. Therefore, data's amount generated by a sampling of a RF signal decreases. The band pass sampling is a Harmonic sampling or a Sub sampling, uses sampling frequency which is lower than Nyquist rate, a result of the use generates purposely aliasing. Hence the band pass sampling has an advantage that sampling rate basically depends on a data's bandwidth.

The band pass sampling is usually applied to a digital direct conversion or a RF direct conversion. When a band pass sampling is applied to a digital direct conversion, because the a band pass sampling directly performs a sampling after amplifying a RF signal received through a antenna in LNA, a wireless receiver of low-price and small-size may be embodied.

FIG. 1 illustrates a structure of a typical digital direct conversion receiver.

The typical digital direct conversion receiver will hereinafter be described with reference to FIG. 1.

An integer-position signal may be down-converted by $1^{st}$-order BPS (Band Pass Sampling) of minimum sample rate 2B.

A non-integer-position signal may be down-converted by $1^{st}$-order BPS (Band Pass Sampling) of fs>2B sample rate, but a sampling frequency fs may vary according to the position of a signal bandwidth.

Therefore a sample rate may vary according to a bandwidth and the position of band for universal access, hence a bandwidth of a RF filter may be varied.

A $2^{nd}$-order BPS (Band Pass Sampling) performs a signal process and a result of the performance removes aliasing, after sampling with using two analog-digital converter(ADC) having relative time delay. Therefore, a sample rate may be selected without considering aliasing, a minimum sampling frequency may be selected with the same as a bandwidth of a signal.

FIG. 2 illustrates a block diagram of a $2^{nd}$-order BPS receiver.

The typical $2^{nd}$-order BPS receiver will hereinafter be described with reference to FIG. 2.

When a bandwidth of an input steam is B, a sample rate for a RF signal is B. At this time, the aliasing for a RF signal is generated.

The latest paper discloses that sample is performed by delay time of $\tau_B = -2(n+1)T\Delta$ when a data locates in Integer position, hence a response of a digital filter isn't affected, a digital embody of interpolant is possible.

The other side, CR(cognitive Radio) or SR(Smart Radio) uses a spectrum sensing for effective use of a frequency. The spectrum sensing is used for searching the other frequency for data communication while performing data communication through one frequency. Therefore, the $1^{st}$-order BPS or $2^{nd}$-order BPS described by FIG. 1 and FIG. 2 have difficulty for simultaneously receiving and processing two frequency, hence the $1^{st}$-order BPS or $2^{nd}$-order BPS have difficulty for application to CR or SR.

Besides, the object of the FIG. 1's $1^{st}$-order BPS receiver and the FIG. 2's $2^{nd}$-order BPS receiver is down-conversion of one RF signal. When more than one RF signal is simultaneously received and processed, a first RF signal is received by the receiver illustrated in FIG. 1 or FIG. 2, but if a second RF signal isn't located in special frequency band, aliasing may generate. In other word, a conventional digital direct conversion (BPS) receiver has a defect occurring aliasing while simultaneously receiving a plurality of RF signals.

SUMMARY OF THE INVENTION

The present invention provides a BPS receiver which receives simultaneously RF signals of different frequency band, at this time a BPS receiver may not generate aliasing. The present invention provides BPS receiver which receives simultaneously RF signals of different frequency band with no large change of a conventional receiver's structure.

According to an aspect of the present invention, there is provided a band-pass sampling (BPS) receiver including: a sampling process unit including first and second samplers and sampling a signal, obtained by adding first and second RF signals of different frequency bands, with a time difference; a quantization process unit including first and second quantizers and generating a first stream signal and a second stream signal by quantizing a signal, which is output from the sampling process unit after the sum signal of the first and second RF signals are down-converted according to respective time information and output from the sampling process unit; and a signal process unit performing interpolation with reference to a phase difference of the frequency bands of the first and second stream signals to separate the first and second RF signals.

According to the present invention, a BPS receiver receives simultaneously RF signals of different frequency band and processes the RF signal received, at this time the BPS receiver can minimize aliasing generated by RF signal.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

Figure 1:
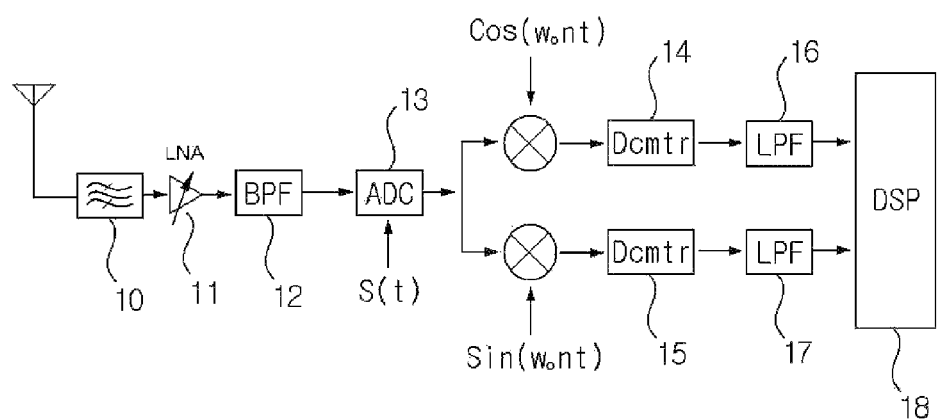
FIG. 1 illustrates a structure of a typical digital direct conversion receiver.
Figure 2:
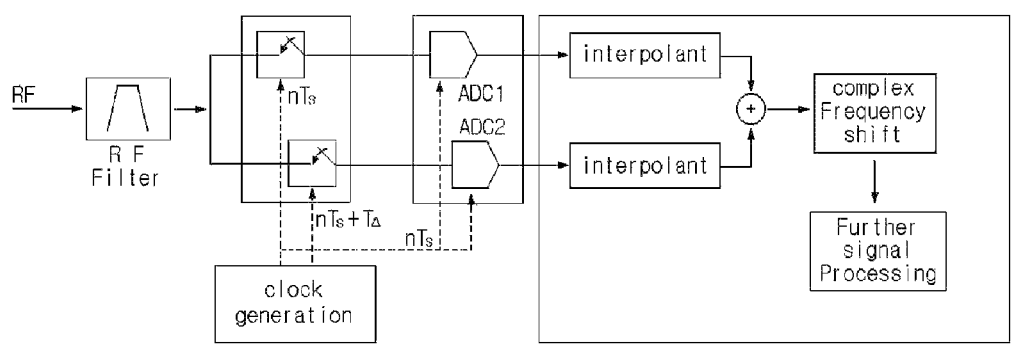
FIG. 2 illustrates a block diagram of a $2^{nd}$-order BPS receiver.
Figure 3:
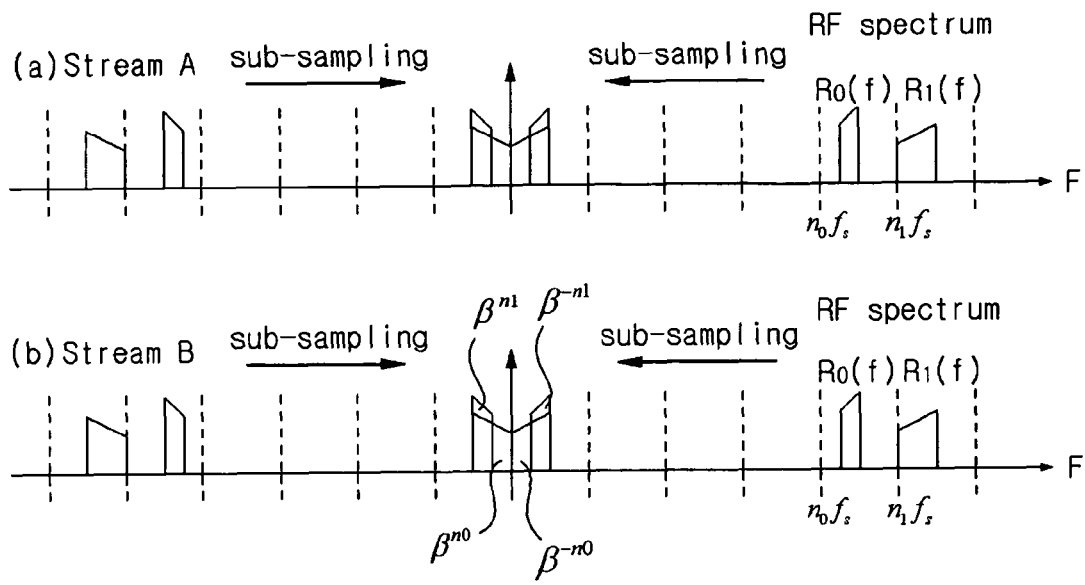
FIG. 3 illustrates a method receiving simultaneously a plurality of RF signals through a BPS receiver of the present invention.

FIG. 3 illustrates a method receiving simultaneously a plurality of RF signals through a BPS receiver of the present invention.

Referring to FIG. 3, if different two RF signal, $R_0(f)$, $R_1(f)$ is located different frequency zone, n0, n1 in area divided by frequency interval (fs) and sampling rate is fs, the present invention separates two RF signals with using different phase shift of $R_0(f)$ and $R_1(f)$ when sub-sampling RF signal, $R_0(f)$ and $R_1(f)$.

FIG. 3's (a) illustrates that aliasing is generated according to mutual overlap in baseband when RF signal, $R_0(f)$ and $R_1(f)$ is sub-sampled. FIG. 3's (b) illustrates different phase shift($\beta^{-n0}$ and $\beta^{-n1}$) for a first stream signal and a second stream signal, a discrete signal down-converting respectively the $R_0(f)$ and $R_1(f)$.

The present invention separates a RF signal in baseband with using a $2^{nd}$-order BPS signal process technology, if a RF signal is located distinctively in different frequency zone. In other words, the present invention provides a BPS receiver for Environment sensing in order to search the other RF signal existing in the other frequency zone as receiving one RF signal in one frequency zone.

Figure 4:
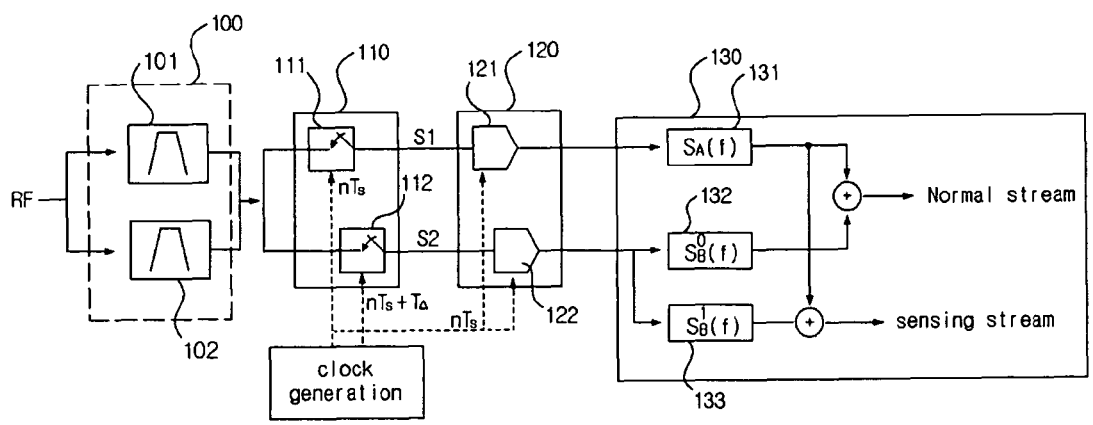
FIG. 4 illustrates a block diagram of a BPS receiver according to an exemplary embodiment of the present invention.

FIG. 4 illustrates a block diagram of a BPS receiver according to an exemplary embodiment of the present invention.

Referring to FIG. 4, a BPS receiver according to the present invention includes a RF filter unit(100), a sampling process unit(110), a quantization process unit(120), and a signal process unit(130). The BPS receiver is a structure of a $2^{nd}$-order BPS algorithm which can receive simultaneously two RF signals for Environment sensing.

A RF filter unit(100) includes two tunable filters(101, 102) for receiving two RF signals(such as a first RF signal, a second RF signal). The frequency band selected by a RF filter unit(100) is provided to a sampling process unit(110), a sampling process unit(110) samples respectively a first RF signal and a second RF signal using a sampling frequency(fs) of more than 2B. In this case, the sampling process unit(110) includes a first sampler(111) and a second sampler(112). Wherein, B is wider bandwidth between the first RF signal and the second RF signal. At this point, a second stream signal has phase shift with a first stream signal according to sampling with fixed time delay for a first stream signal.

A quantization process unit(120) includes includes a first quantizer(121) for digital-converting a first stream signal, and a second quantizer(122) for digital-converting a second stream signal. A quantization process unit(120) and a sampling process unit(110) are linked a clock provided from a clock generation.

A signal process unit(130) separates a first signal and a second signal using FIR filtering, as preventing aliasing with using the deviation for a phase shift of a digital signal of the first quantizer(121) corresponding to a first stream signal and a digital signal of the second quantizer(122) corresponding to a second stream signal. With this in mind, a signal process unit(130) includes a first interpolant unit(131), a second interpolant unit(132) and a third interpolant unit(133).

A first interpolant unit(131), a second interpolant unit(132) and a third interpolant unit(133) may clearly separate a first signal and a second signal with using respective interpolant value to restrain mutually a first signal or a second signal.

The method for separating a first RF signal($R_0(f)$) and a second RF signal($R_1(f)$) through a first interpolant unit(131) and a second interpolant unit(132) is described with reference to the following equation.

First of all, a first interpolant unit(131) and a second interpolant unit(132) restraining $R_1(f)$ signal in order to separate $R_0(f)$ signal, should satisfy the condition of the following equation 1 and equation 2.

$$B \cdot [S_A(f) \cdot R_{0A+}{}^{\sigma^2}(f) + S_B{}^0(f) \cdot R_{0B+}{}^{\sigma^2}(f)] = C \cdot R_{0A+}(f - 2n_0 B)$$

$$B \cdot [S_A(f) \cdot R_{0A-}{}^{\sigma^2}(f) + S_B{}^0(f) \cdot R_{0B-}{}^{\sigma^2}(f)] = C \cdot R_{0A-}(f + 2n_0 B) \quad \text{[equation 1]}$$

$$B \cdot [S_A(f) \cdot R_{1A+}{}^{\sigma^2}(f) + S_B{}^0(f) \cdot R_{1B+}{}^{\sigma^2}(f)] = 0$$

$$B \cdot [S_A(f) \cdot R_{1A-}{}^{\sigma^2}(f) + S_B{}^0(f) \cdot R_{1B-}{}^{\sigma^2}(f)] = 0$$

$$R_{0,A-}(f + 2nB) \quad \text{[equation 2]}$$

Wherein, B is a band width of a RF filter unit(100), C is a random complex constant, $R_{0,A+}(f-2nB)$ and $R_{0,A-}(f-2nB)$ is a positive(+) frequency spectrum and a negative(−) frequency spectrum for a first RF signal transmitted respectively to a baseband. And, $R^{\delta 2}(f)$ is a frequency spectrum of a RF signal band-pass sampled by $2^{nd}$-order, $R_A{}^{\delta 2}(f)$ is a frequency spectrum of sample stream A, $R_B{}^{\delta 2}(f)$ is a frequency spectrum of sample stream B.

In order to solve an equation for equation 1 and equation 2, $S_A(f)$ is set as equation (3), $S_B{}^0(f)$ is solved.

$$S_A(f) = \begin{cases} 1/B & |f| < B \\ 0 & \text{otherwise} \end{cases} \quad \text{[equation 3]}$$

In order to remove an image, a condition of |f|<B is substituted to equation 1 and equation 2. $S_B{}^0(f)$ is the following equation 4.

$$S_B^0(f) = \begin{cases} \dfrac{-\beta^{-n_1}}{B} & -B < f < 0 \\ \dfrac{-\beta^{n_1}}{B} & 0 < f < B \\ 0 & \text{otherwise} \end{cases} \quad \text{[equation 4]}$$

Wherein, $\beta = e^{-j2\pi T_\Delta f_s} = e^{-j2\pi T_\Delta (2B)}$ is phase shift of sample stream A and sample stream B for $R_0(f)$ signal.

The interpolant $S_A(f)$ and $S_B{}^1(f)$ restraining $R_0(f)$ signal in order to separate $R_1(f)$ signal, should satisfy the following equation 5 and equation 6.

$$B \cdot [S_A(f) \cdot R_{0A+}{}^{\sigma^2}(f) + S_B{}^1(f) \cdot R_{0B+}{}^{\sigma^2}(f)] = 0$$

$$B \cdot [S_A(f) \cdot R_{0A-}{}^{\sigma^2}(f) + S_B{}^1(f) \cdot R_{0B-}{}^{\sigma^2}(f)] = 0 \quad \text{[equation 5]}$$

$$B \cdot [S_A(f) \cdot R_{1A+}{}^{\sigma^2}(f) + S_B{}^1(f) \cdot R_{1B+}{}^{\sigma^2}(f)] = C \cdot R_{1A+}(f - 2n_1 B)$$

$$B \cdot [S_A(f) \cdot R_{1A-}{}^{\sigma^2}(f) + S_B{}^1(f) \cdot R_{1B-}{}^{\sigma^2}(f)] = C \cdot R_{1A-}(f + 2n_1 B) \quad \text{[equation 6]}$$

If equation 5 and equation 6 is solved by a process coming to equation 4 from equation 1, $S_B{}^1(f)$ may be as equation (7).

$$S_B^1(f) = \begin{cases} \dfrac{-\beta^{-n_0}}{B} & -B < f < 0 \\ \dfrac{-\beta^{n_0}}{B} & 0 < f < B \\ 0 & \text{otherwise} \end{cases} \quad \text{[equation 7]}$$

$S_A(f)$, $S_B^0(f)$, $S_B^1(f)$ corresponding to a first interpolant unit (131), a second interpolant unit (132) and a third interpolant (133) are set out respectively according equation 3, equation 4 and equation 7, two RF signals located in a different frequency zone may be received without an interference in a baseband.

And, when a $R_0(f)$ signal is a signal to receive and a $R_1(f)$ signal is an interference signal, the only $R_1(f)$ signal is effectively removed, so that the $R_0(f)$ signal may be received normally.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A BPS receiver comprising:
    a sampling process unit which samples a signal summing a first RF signal and a second RF signal of different frequency bands with time gap;
    a quantization process unit which generates a first stream signal and a second stream signal, a digital signal down-converted through respective time information in the signal summing the first RF signal and the second RF signal; and
    a signal process unit which performs FIR filtering with reference to phase shift for a respect frequency band of the first stream signal and the second stream signal, separates the first RF signal and the second RF signal based on a result of the performance,
    wherein the signal process unit comprises:
    a first interpolant unit and a second interpolant unit performs FIR filtering by inputting the first stream signal and the second stream signal; and
    a third interpolant unit performs FIR filtering by inputting the first stream signal and the second stream signal.

2. The BPS receiver of claim 1, wherein the first interpolant unit satisfies the condition of the following equation:

$$S_A(f) = \begin{cases} 1/B & |f| < B \\ 0 & \text{otherwise} \end{cases}$$

wherein B is wider bandwidth between the first RF signal and the second RF signal.

3. The BPS receiver of claim 2, wherein the second interpolant unit satisfies the condition of the following equation:

$$S_B^0(f) = \begin{cases} \dfrac{-\beta^{-n_1}}{B} & -B < f < 0 \\ \dfrac{-\beta^{n_1}}{B} & 0 < f < B \\ 0 & \text{otherwise} \end{cases}$$

wherein $\beta = e^{-j2\pi T_\Delta f_s} = e^{-j2\pi T_\Delta (2B)}$ is phase shift of sample stream A and sample stream B for $R_0(f)$ signal.

4. The BPS receiver of claim 3, wherein the third interpolant unit satisfies the condition of the following equation:

$$S_B^1(f) = \begin{cases} \dfrac{-\beta^{-n_0}}{B} & -B < f < 0 \\ \dfrac{-\beta^{n_0}}{B} & 0 < f < B \\ 0 & \text{otherwise.} \end{cases}$$

\* \* \* \* \*